(12) United States Patent
Prieto et al.

(10) Patent No.: US 8,214,219 B2
(45) Date of Patent: Jul. 3, 2012

(54) SPEECH COMMUNICATIONS SYSTEM FOR A VEHICLE AND METHOD OF OPERATING A SPEECH COMMUNICATIONS SYSTEM FOR A VEHICLE

(75) Inventors: Ramon Prieto, Mountain View, CA (US); Rohit Mishra, San Jose, CA (US)

(73) Assignee: Volkswagen of America, Inc., Auburn Hills, MI (US)

( * ) Notice: Subject to any disclaimer, the term of this patent is extended or adjusted under 35 U.S.C. 154(b) by 810 days.

(21) Appl. No.: 11/521,929

(22) Filed: Sep. 15, 2006

(65) Prior Publication Data
US 2008/0071547 A1  Mar. 20, 2008

(51) Int. Cl.
*G10L 21/00* (2006.01)
(52) U.S. Cl. ........ 704/275; 704/233; 704/211; 704/270; 381/58; 381/92; 381/71.1; 701/36
(58) Field of Classification Search ........... 704/275, 704/270, 233, 211; 381/107; 280/735
See application file for complete search history.

(56) References Cited

U.S. PATENT DOCUMENTS

| | | | | |
|---|---|---|---|---|
| 5,214,707 | A * | 5/1993 | Fujimoto et al. | 704/275 |
| 5,450,525 | A * | 9/1995 | Russell et al. | 704/275 |
| 6,889,189 | B2 * | 5/2005 | Boman et al. | 704/270 |
| 7,826,945 | B2 * | 11/2010 | Zhang et al. | 701/36 |
| 2002/0009203 | A1 * | 1/2002 | Erten | 381/92 |
| 2002/0089157 | A1 * | 7/2002 | Breed et al. | 280/735 |
| 2002/0102002 | A1 | 8/2002 | Gersabeck et al. | |
| 2003/0061049 | A1 * | 3/2003 | Erten | 704/260 |
| 2003/0110041 | A1 | 6/2003 | Breuer et al. | |
| 2003/0138118 | A1 * | 7/2003 | Stahl | 381/107 |
| 2004/0037436 | A1 * | 2/2004 | Rui | 381/92 |
| 2004/0122575 | A1 | 6/2004 | Marchthaler | |
| 2004/0138882 | A1 * | 7/2004 | Miyazawa | 704/233 |
| 2005/0071159 | A1 * | 3/2005 | Boman et al. | 704/233 |
| 2005/0131695 | A1 * | 6/2005 | Lucente et al. | 704/257 |

(Continued)

FOREIGN PATENT DOCUMENTS
DE   19962218 A1   7/2001
(Continued)

OTHER PUBLICATIONS

Qiru Zhou et al., "An Enhanced BLSTIP Dialogue Research Platform", Proceedings of ICSLP 2000, Oct. 16, 2000, XP007010977.*

(Continued)

*Primary Examiner* — Douglas Godbold
*Assistant Examiner* — Mark Villena
(74) *Attorney, Agent, or Firm* — Manfred Beck, P.A.

(57) ABSTRACT

A speech communications system for a vehicle includes a microphone system provided in the vehicle interior in order to detect audio information. An interaction manager provides grammar information to a speech recognizer. The speech recognizer provides speech recognition results to the interaction manager. An acoustic echo canceller eliminates portions of the audio information detected by the microphone system. A sound localizer determines a sound source location in the vehicle interior. A method of operating a speech communications system in a vehicle is also provided. An interruptible text-to-speech operation provides a speech output to a user. Voice information is requested from the user for a maximum number of times if insufficient voice information or no voice information is provided in response to the speech output provided by the interruptible text-to-speech operation. The dialog context of an unfinished speech interaction is saved.

14 Claims, 3 Drawing Sheets

U.S. PATENT DOCUMENTS

| | | | |
|---|---|---|---|
| 2005/0265560 A1* | 12/2005 | Haulick et al. | 381/58 |
| 2006/0095268 A1 | 5/2006 | Yano et al. | |
| 2006/0212291 A1* | 9/2006 | Matsuo | 704/231 |
| 2006/0222184 A1* | 10/2006 | Buck et al. | 381/71.1 |
| 2007/0005350 A1* | 1/2007 | Amada | 704/211 |
| 2007/0038444 A1* | 2/2007 | Buck et al. | 704/235 |
| 2007/0050191 A1* | 3/2007 | Weider et al. | 704/275 |

FOREIGN PATENT DOCUMENTS

| | | |
|---|---|---|
| EP | 0472356 A1 | 2/1992 |
| EP | 1083543 A2 | 3/2001 |
| EP | 1 562 180 A1 | 8/2005 |
| EP | 1560200 A1 | 8/2005 |
| JP | 2001042891 A | 2/2001 |
| JP | 2005157086 A | 6/2005 |
| WO | WO 2004/038697 A1 | 5/2004 |
| WO | 2006082764 A1 | 8/2006 |

OTHER PUBLICATIONS

Extended European Search Report for European Patent Application EP 07 01 7939, dated Apr. 18, 2008.

Michael S. Brandstein et al., "A Closed-Form Location Estimator for Use with Room Environment Microphone Arrays", IEEE Transactions on Speech and Audio Processing, IEEE Service Center, New York, NY, US, vol. 5, No. 1, Jan. 1997, XP011054220, ISSN: 1063-6676.

Qiru Zhou et al, "An Enhanced BLSTIP Dialogue Research Platform", Proceedings of ICSLP 2000, Oct. 16, 2000, XP007010977.

Omologo M. et al, "Environmental Conditions and Acoustic Transduction in Hands-Free Speech Recognition," Speech Communication, Amsterdam, NL, vol. 25, No. 1-3, Aug. 1998, pp. 75-95.

Partial European Search Report for European Patent Application EP 07 01 7937, dated Dec. 27, 2007.

* cited by examiner

SPEECH COMMUNICATIONS SYSTEM FOR A VEHICLE AND METHOD OF OPERATING A SPEECH COMMUNICATIONS SYSTEM FOR A VEHICLE

STATEMENT REGARDING FEDERALLY SPONSORED RESEARCH OR DEVELOPMENT

The present invention was made with support from the Advanced Technology Program (ATP) of the National Institute of Standards and Technology (NIST) under project number 00-00-5415. Accordingly, the U.S. government has certain rights in the present invention.

BACKGROUND OF THE INVENTION

Field of the Invention

The present invention relates to a speech communications system for a vehicle and to a method of operating a speech communications system for a vehicle.

Car manufacturers increasingly provide cars with in-car electronic systems that have speech recognition and text-to-speech functions. Such in-car electronic systems are for example navigation systems, stereo systems, and telephone systems that can recognize speech that is spoken by a driver. In case of a navigation system, these speech recognition and text-to-speech capabilities allow a driver to ask for directions to a specific street address and to receive voice guidance on how to reach the desired street address. In case of a stereo system, the driver may for example ask the stereo system to play a favorite song or a favorite radio station.

Typical conventional in-car speech recognition systems require the driver or user to press a so-called push-to-talk button in order to start a voice interaction. After the push-to-talk button has been pressed, the in-car speech recognition system provides an audio signal, usually a "beep" sound provided via the car speakers, in order to let the driver know that the microphone for the speech recognition is now open and that the driver can now talk. When the speech recognition system provides a speech response back to the driver, the driver generally has to wait until the speech recognition system is finished with its speech response before the driver can say anything to the speech recognition system. Alternatively, the driver has to wait until the speech recognition indicates with a "beep" sound that the microphone is open and that the driver can talk to the speech recognition system. If the driver wants to interrupt the reply coming from the speech recognition system, then the driver will have to press the push-to-talk button and may have to wait for the "beep" before the driver can say anything.

The above-described interaction between the driver and the speech recognition system is significantly different from a normal human-to-human interaction due to the requirement of having to press a push-to-talk button or having to wait for an audio signal such as a "beep" sound before the driver can speak to the speech recognition system. In a human-to-human voice interaction, the start of the interaction can be naturally initiated by voice from anyone participating in the interaction. Also, in a human-to-human voice interaction, the interaction can be interrupted naturally by voice and anyone who is involved in the interaction can interrupt the other side. Since human beings are used to human-to-human interactions, they encounter problems when they have to use a push-to-talk button or have to wait for a "beep" sound before they can speak.

A typical problem that drivers have when they interact with a speech recognition system is that the drivers forget to press the push-to-talk button before they talk. Especially new users who are not yet familiar with the speech recognition system do not remember to press the push-to-talk button before talking to the speech recognition system. Thus new users often talk to the speech recognition system, but the speech recognition system is not listening to the user.

A further typical problem that drivers have when using the above-described speech recognition system is that drivers find it difficult to time their speech utterance to the audio signal, i.e. the beep sound, that indicates that the speech recognition system is listening. If the driver is in a hurry when pressing the push-to-talk button, the driver tends to speak before or during the beep sound. The speech recognition system plays the beep sound in the middle of the driver's speech utterance or after the driver's speech utterance. As a result, the speech recognition system listens only to either a portion of the driver's speech utterance or does not listen at all to what the driver said.

Another problem of the above-described conventional speech recognition system is that a reply coming from the speech recognition system cannot be interrupted by a voice utterance from the user. This is a disadvantage when the driver is familiar with the replies of the speech recognition system and the driver already knows what he/she has to say before the speech recognition system finishes talking. In such a case, the driver tends to reply before the speech recognition system finishes talking. Since the above-described conventional speech recognition system is not listening to the driver during the speech output, the driver will have to repeat his/her reply. The driver will have to either press the push-to-talk button and wait for the beep sound or wait until the speech recognition system is finished with its speech output and wait for the beep sound that indicates that the speech recognition system is now listening.

Some conventional speech recognition systems have tried to solve the above-described problems in part by not requiring the use of the push-to-talk button at every step of the interaction between the driver and the speech recognition system. For example, the driver has to press the push-to-talk button at the beginning of the interaction in order to start the dialog with the speech recognition system. During the interaction, the driver will normally talk to the speech recognition system only after the speech recognition system plays an audio signal, i.e. a beep sound, indicating that the speech recognition system is now listening. In case the driver does not want to wait for the beep sound and wants to interrupt the speech output of the speech recognition system, the driver has to press the push-to-talk button. Such a speech recognition system does not require the driver to press the push-to-talk button at every interaction step; however, the driver still has to wait until the speech recognition system finishes the speech output.

A disadvantage of such as speech recognition system is that the driver may get confused because some interaction steps, such as starting and interrupting the interaction, require the use of the push-to-talk button whereas other interaction steps do not require the use of the push-to-talk button. Another disadvantage is that in case the driver cannot respond to a question of the speech recognition due to an unexpected driving situation that requires the full attention of the driver, the speech recognition system may repeatedly prompt the driver for a response and thus distract the driver.

Other conventional speech recognition systems for vehicles operate like the conventional speech recognition system described above, except they do not provide an audio feedback to the user, i.e. they do not provide a beep sound indicating that the speech recognition system is listening.

With these speech recognition systems, the driver still needs to press the push-to-talk button to be able to start the interaction. When the speech recognition system is speaking to the driver, the driver will still have to wait until the speech recognition system finishes talking or the driver will have to press the push-to-talk button in order to interrupt the speech output of the speech recognition system.

There are also conventional speech recognition systems that constantly record what the driver is saying. As soon as the driver presses the push-to-talk button, the speech recognition system sends all the voice information spoken by the driver after the driver pressed the push-to-talk button and additionally the recorded voice information of a few fractions of a second before the driver pressed the push-to-talk button to the speech recognizer. By constantly recording the voice information of the driver, some of the problems related to the synchronization of the flow of information between the speech recognition system and the driver are alleviated. However, the driver still has to press the push-to-talk button to start the interaction with the speech recognition system and the driver also has to press the push-to-talk button in order to interrupt the speech output of the speech recognition system.

European Patent Application No. EP 1 562 180 A1 discloses a speech dialog system for controlling an electronic device. The speech recognition device includes a control command determining means to be activated by a keyword for determining a control command for controlling the electronic device. The speech dialog system therefore does not need a push-to-talk button. The speech dialog system of EP 1 562 180 A1 preferably includes noise suppression in order to filter out unwanted audio signals. Further speech recognition devices with the capability to detect keywords are also described in Patent Abstract of Japan No. 2001042891 A and Patent Abstract of Japan No. 2005157086 A. International Publication No. 2004/038697 A1 discloses a speech control unit including a microphone array for receiving audio signals and a keyword recognition system in order to be more selective for those parts of the audio signals which correspond to speech that is spoken by a given user.

SUMMARY OF THE INVENTION

It is accordingly an object of the invention to provide a speech communications system for a vehicle that overcomes the above-mentioned disadvantages of the heretofore-known speech communications systems of this general type. It is a further object of the invention to provide an improved method of operating a speech communications system for a vehicle. It is in particular an object of the invention to provide an intuitive and user-friendly speech communications system and a method of operating a speech communications system that allow the user to reliably and efficiently communicate with the system.

With the foregoing and other objects in view there is provided, in accordance with the invention, in combination with a vehicle having a vehicle interior, a speech communications system which includes:

a microphone system provided in the vehicle interior, the microphone system being configured to detect audio information;

a speech recognizer operatively connected to the microphone system;

an interaction manager operatively connected to the speech recognizer, the interaction manager providing grammar information to the speech recognizer, the speech recognizer being configured to provide speech recognition results to the interaction manager;

an acoustic echo canceller operatively connected to the speech recognizer, the acoustic echo canceller being configured to at least partially eliminate portions of the audio information detected by the microphone system; and a sound localizer operatively connected to the microphone system and to the interaction manager, the sound localizer being configured to determine a sound source location in the vehicle interior.

Using an acoustic echo canceller and a sound localizer for a speech communication systems in a vehicle interior allows an advantageous reduction in speech recognition errors that are associated with an operation of speech recognition systems in motor vehicles.

In accordance with another feature of the invention, the interaction manager selectively enables and disables a user-controllable function in dependence on the sound source location. The interaction manager can thus for example enable control over safety-related features for the driver and disable those features for other passengers in the vehicle.

In accordance with yet another feature of the invention, the microphone system includes a first microphone array and a second microphone array; the first microphone array and the second microphone array are spaced from one another by a given spacing distance; the sound localizer determines a first sound source angle as a function of audio information provided by the first microphone array and the sound localizer determines a second sound source angle as a function of audio information provided by the second microphone array; and the sound localizer determines a sound source location in dependence on the first sound source angle and the second sound source angle.

In accordance with a further feature of the invention, a seat sensor is connected to the sound localizer, the seat sensor provides seat occupancy information to the sound localizer; the microphone system includes a first microphone array and a second microphone array; the first microphone array and the second microphone array are spaced from one another by a given spacing distance; the sound localizer determines a first sound source angle as a function of audio information provided by the first microphone array and the sound localizer determines a second sound source angle as a function of audio information provided by the second microphone array; and the sound localizer determines a sound source location in dependence on the first sound source angle, the second sound source angle and the seat occupancy information. Using the seat occupancy information advantageously increases reliability and accuracy when determining the sound source location.

In accordance with another feature of the invention, a text-to-speech unit is operatively connected to the interaction manager, the interaction manager is configured to prompt the text-to-speech unit to provide a speech output; and the acoustic echo canceller is configured to at least partially eliminate the speech output provided by the text-to-speech unit from the audio information detected by the microphone system.

In accordance with a further feature of the invention, a text-to-speech unit is operatively connected to the interaction manager; and the interaction manager is configured to selectively prompt the text-to-speech unit to provide a speech output and to interrupt a speech output. An advantage of the interruptible speech output is that a user can interact with the speech communications system in an intuitive manner, similar to how a person would interact with another person.

In accordance with yet a further feature of the invention, a vehicle stereo system is operatively connected to the interaction manager, the interaction manager is configured to control a volume setting for the vehicle stereo system, e.g. by reducing the volume of a radio; and the acoustic echo canceller is configured to at least partially eliminate sound produced by the vehicle stereo system from the audio information detected by the microphone system. Reducing the volume setting for the vehicle stereo system and filtering out the audio information coming from the vehicle stereo system reduces unwanted noise and improves the accuracy of the speech recognition results.

In accordance with another feature of the invention, the vehicle has a ventilation fan operatively connected to the interaction manager; and the interaction manager controls a fan speed setting for the ventilation fan. Reducing the fan speed setting advantageously reduces unwanted noise and thus improves the accuracy of the speech recognition results.

In accordance with yet another feature of the invention, the speech recognizer is configured to recognize a spoken keyword; and the interaction manager is configured to retrieve a stored dialog context and to start a speech interaction triggered by the spoken keyword. Using a keyword to start an interaction improves user-friendliness because the user does not have to press the push-to-talk button when the user wants to speak to the speech communications system.

With the objects of the invention in view there is also provided, a method of operating a speech communications system in a vehicle, which includes the following steps:

detecting audio information with a microphone system provided in a vehicle interior;

running an interruptible text-to-speech operation based on a dialog context in order to provide a speech output;

running a speech recognition operation for providing a speech recognition result;

requesting voice information for a maximum number of times if insufficient voice information or no voice information is provided in response to the speech output provided by the interruptible text-to-speech operation; and saving a dialog context of an unfinished speech interaction.

By requesting voice information only a maximum number of times, the speech communications system provides a situation-dependent reaction for situations when the user has to focus on tasks that are more important than answering the speech communications system's questions.

Another mode of the method according to the invention includes recognizing a keyword with the speech recognition operation; and retrieving the dialog context which has been saved for the unfinished speech interaction. A user can advantageously continue an unfinished interaction at the point where it was interrupted or broken off by simply saying a keyword.

Yet another mode of the method according to the invention includes at least partially eliminating the speech output provided by the text-to-speech operation from the audio information detected with the microphone system by performing an echo cancellation operation.

A further mode of the method according to the invention includes at least partially eliminating sound generated by a vehicle stereo system from the audio information detected with the microphone system by performing an echo cancellation operation. Eliminating audio that comes from the text-to-speech unit or the stereo system (e.g. radio) reduces unwanted noise for the speech recognition and therefore improves the speech recognition results.

Another mode of the method according to the invention includes controlling a fan speed of a ventilation fan in order to reduce noise and improve the speech recognition result provided by the speech recognition operation.

A further mode of the method according to the invention includes controlling a volume setting of a vehicle stereo system in order to improve the speech recognition result provided by the speech recognition operation. Turning down the volume of the stereo system (e.g. the volume of the radio) or muting the stereo system reduces unwanted audio and improves the speech recognition operation.

Another mode of the method according to the invention includes determining a first sound source angle as a function of audio information provided by a first microphone array of the microphone system; determining a second sound source angle as a function of audio information provided by a second microphone array of the microphone system; and determining a sound source location based on the first sound source angle and the second sound source angle.

Yet another mode of the method according to the invention includes detecting a seat occupancy by using a seat sensor; and determining a sound source location in dependence on the first sound source angle, the second sound source angle, and seat occupancy information.

A further mode of the method according to the invention includes determining a sound source location in the vehicle interior; and selectively enabling and disabling a user-controllable function in dependence on the sound source location. In this manner it is possible to enable safety-related functions, such as adjusting the outside rear view mirrors or turning off the windshield wipers, only for the driver and disable those functions for other passengers in the vehicle.

The above-defined features of the speech communications system according to the invention avoid disadvantages associated with a push-to-talk system while keeping the advantages of the push-to-talk system. The driver or user can start the interaction by using a keyword through voice, without having to press a push-to-talk button. The driver or user does not have to wait for an audio signal (e.g. a "beep") to start the interaction by voice. The keyword can be a wake-up keyword such as the name the vehicle, e.g. "VOLKSWAGEN" or "AUDI." As such, the problem of forgetting to push the push-to-talk button does not exist. Also, the driver will not have any synchronization problems with the beep sound, since the driver can speak at any time.

When the speech communications system replies back to the user, the user will be able to interrupt the speech output of the speech communications system. If the speech communications system has finished replying and the user knows already what his/her choice is, the user can speak. As soon as the user speaks, the speech communications system will detect that speech is coming from the user and the speech communications system will stop talking. In this way, the user does not have to wait until the speech communications system is finished talking and does not have to wait for an audio signal indicating that the speech communications system is listening.

In order to make sure that a driver still has full control over the driving-specific interaction dialogs, the speech communications system will know where the voice is coming from. The speech communications system will know whether the voice is coming from the driver seat, the front passenger seat or one of the rear passenger seats. In fact, the front seat passenger or the rear seat passengers can also talk to the speech communications system, however, they can control only certain non-driving specific functions, such as controlling the stereo system. Since the speech communications system knows the location of the sound source and thus knows whether the driver or one of the passengers spoke, it will disable any driving-specific functions for voice coming from the front or rear passenger seats.

Other features which are considered as characteristic for the invention are set forth in the appended claims.

Although the invention is illustrated and described herein as embodied in a speech communications system for a vehicle and to a method of operating a speech communications system for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
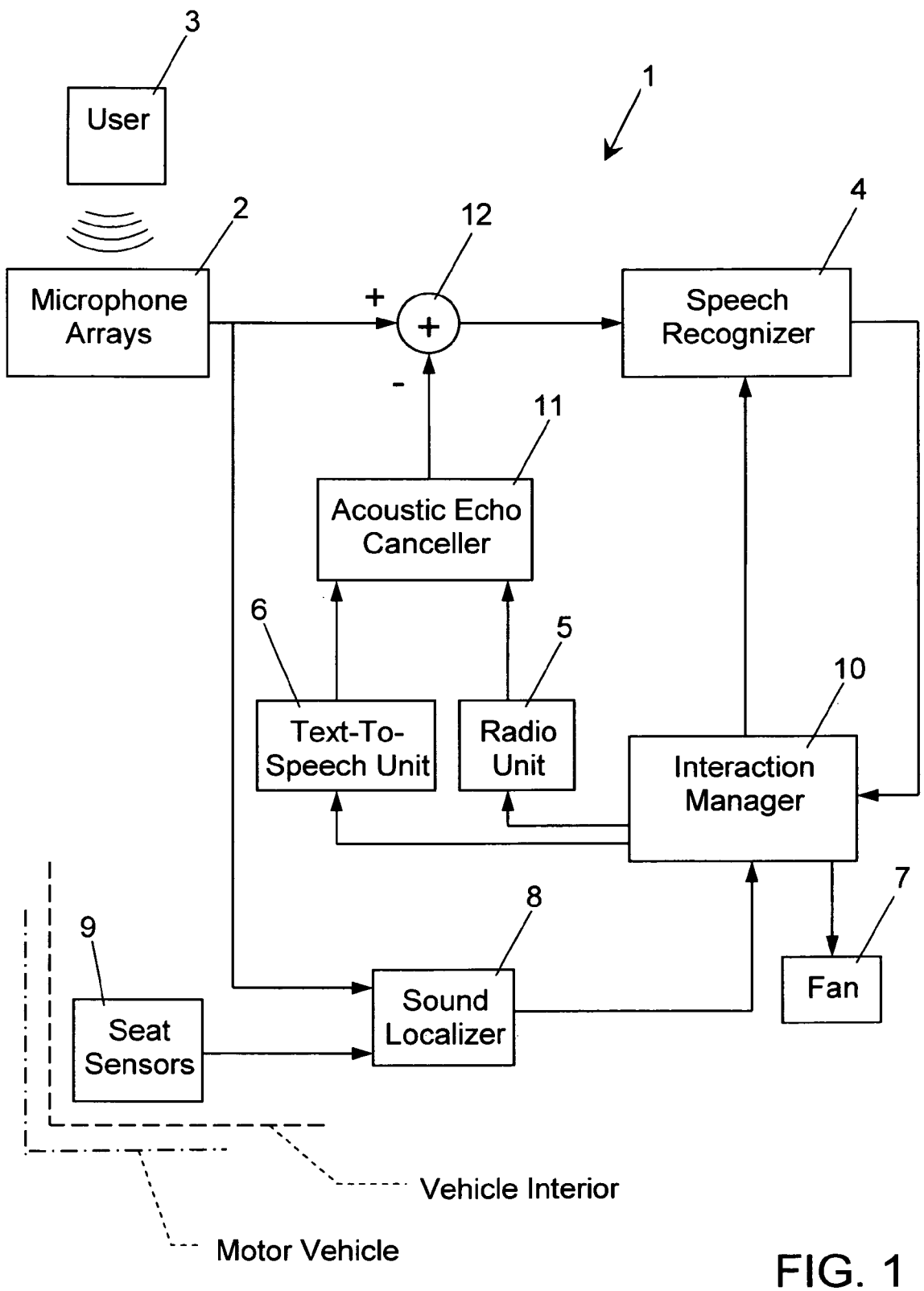
FIG. 1 is a simplified block diagram illustrating components of the speech communications system for a vehicle in accordance with the invention.

Referring now to the figures of the drawings in detail and first, particularly, to FIG. 1 thereof, there is shown a simplified block diagram illustrating the speech communications system 1 for a motor vehicle in accordance with the invention. The motor vehicle is only schematically indicated as a dash-dotted line. The vehicle interior is schematically indicated as a dashed line.

Microphone arrays 2 are provided in the vehicle interior in order to pick up audio information. The audio information picked up by the microphones of the microphone arrays 2 may include voice information coming from the user 3. The user 3 is the driver of the motor vehicle, a front seat passenger, or a rear seat passenger. The audio information picked up by the microphones of the microphone arrays 2 may further include audio information coming from the loudspeakers of the motor vehicle and may for example include music played by a radio unit 5 which is for example part of a car stereo system. The audio information picked up by the microphones of the microphone arrays 2 may further include the audio output of a text-to-speech unit 6 which is the speech output that the speech communications system 1 provides to the user 3 via loudspeakers. The audio information that is picked up by the microphone arrays 2 further includes noise that is generally present when operating a motor vehicle such as the noise produced by the engine of the motor vehicle or by the fan 7 of a ventilation system.

The microphones arrays 2 are positioned in the motor vehicle such that it is possible to determine the direction from which sound is coming from, as will be explained in more detail below. The outputs of the microphone arrays 2 are connected to the input of a sound localizer 8. The speech communications system 1 according to the invention includes seat sensors 9 that are mounted in the car seats in order to detect the presence of seat occupants. The outputs of the seat sensors 9 are connected to the input of the sound localizer 8 in order to provide information about which of the car seats is occupied.

The sound localizer 8 combines or fuses the audio information from the microphone arrays 2 and the sensor information coming from the seat sensors 9 in order to determine the position in the vehicle compartment where the sound is coming from. The output of the sound localizer 8 is connected to an input of the interaction manager 10 in order to provide information about the position of a sound source, i.e. the position of a speaking user 3, to the interaction manager 10.

Further, the output of a speech recognizer 4 is connected to an input of the interaction manager 10. The speech recognizer 4 provides speech recognition results to the interaction manager 10. The interaction manager 10 manages the interaction between the user 3 and the speech communication system 1 based on the information provided by the speech recognizer 4 and the sound localizer 8. More specifically, the interaction manager 10 interprets speech utterances of the user 3 and controls the speech communications system 1 such that certain actions or functions are performed. For example, the interaction manager 10 may control the stereo system in order to play a song that the user 3 requested. The interaction manager 10 may for example also generate a text-to-speech output in order to answer a question or request of the user 3.

The speech communications system 1 further includes an acoustic echo canceller 11. The acoustic echo canceller 11 eliminates the text-to-speech audio and the radio audio from the audio information received by the microphone arrays 2. In order to eliminate audio information generated by the text-to-speech unit 6 and audio information generated by the radio unit 5, the acoustic echo canceller 11 receives the audio information generated by the text-to-speech unit 6 and the radio unit 5 and provides an echo cancellation signal to a node 12 that is connected between the microphone arrays 2 and the speech recognizer 4.

The node 12 receives audio information from the microphone arrays 2 and the echo cancellation signal generated the acoustic echo canceller 11. The audio information from the microphone arrays 2 and the echo cancellation signal are added or combined in the node 12 such that the audio information from the text-to-speech unit 6 and the audio information from the radio unit 5 is at least partially eliminated from the audio information provided by the microphone arrays 2. As a result, the speech recognizer 4 receives the voice information coming from the user 3 but does not, or at least only to a small extent, receive the text-to-speech audio or the radio audio.

By eliminating the text-to-speech audio and the radio audio with the help of the acoustic echo canceller 11, it is possible for the speech recognizer 4 to better detect the presence of voice audio information coming from the user 3. When the presence of voice audio information is detected, the text-to-speech unit 6 can be interrupted and the volume setting for the radio unit 5 can be adjusted to a lower setting or the radio unit 5 can be muted. The interruption of the text-to-speech unit and the control of the volume setting of the radio unit 5 is controlled by the interaction manager 10. FIG. 1 shows in an exemplary manner a radio unit 5, which is for example part of a car stereo system. It is understood that the above-described echo cancellation and volume control operates in the same manner for other components of the stereo system such as a compact disk player or an MP3 player.

The interaction manager 10 is further connected to the speech recognizer 4 in order to provide grammar information to the speech recognizer 4. The grammar information informs the speech recognizer which words and/or patterns of words it has to listen for. By providing grammar information to the speech recognizer 4, the interaction manager 10 is in charge of instructing the speech recognizer 4 what kind of speech utterances can be recognized. The interaction manager 10 is also in charge of lowering the volume of the radio unit 5 in case a keyword has been detected and the interaction between the user 3 and the speech communications system 1 is starting.

The interaction manager 10 is connected to the text-to-speech unit 6 and controls the text-to-speech unit 6. Specifically, the interaction manager 10 controls the speech output by telling the text-to-speech unit 6 what has to be said to the user 3.

The interaction manager 10 is also operatively connected to the fan 7 of the ventilation system or climate control system for the motor vehicle in order to control the fan speed. The interaction manager 10 controls the fan 7 such that the fan speed is lowered when a keyword is detected and the interaction between the user 3 and the speech communications system 1 starts. By lowering the fan speed and the volume of the radio unit 5, the speech communications system 1 improves the speech recognition operation and makes it easier for the user 3 to communicate with the speech communications system 1.

The sound localizer 8, which is connected to the microphone arrays 2 and the seat sensors 9, receives audio information from the microphone arrays 2 and receives information about seat occupancy from the seat sensors 9. The interaction manager 10 is connected to the sound localizer 8 and receives information from the sound localizer 8. Based on this information from the sound localizer 8, the interaction manager 10 knows whether the user 3 speaking to the speech communications system 1 is the driver, the front seat passenger or a rear seat passenger.

Based on whether the driver or a passenger is speaking, the interaction manager 10 will disable or enable certain functions. For example, the interaction manager 10 will enable a driving-related function, such as adjusting a rear view mirror, if the driver has requested that function and disable that function if a front seat passenger or a rear seat passenger has requested that function. In general, the interaction manager 10 will enable functions that are important for safety only if the driver of the motor vehicle requested that function. Functions that are not critical for driving, such as controlling the stereo system or the climate control system, may be enabled for all occupants of the vehicle.

The speech communications system 1 shown in FIG. 1 may additionally include a push-to-talk button in order to augment the control options for the user 3. By providing a push-to-talk button, the driver has full control over the starting point of a speech recognition interaction. Specifically, the driver has full control over when the speech communications system 1 should listen. The push-to-talk button may also be used as a safety feature when driving-related function setups such as the automatic cruise control, the windshield wipers or the side mirrors are to be controlled only by the driver and not by the front or rear seat passengers.

A further advantage of providing a push-to-talk button in the speech communications system shown in FIG. 1 is that the decision to start the speech interaction is not affected by the noise residual that may affect a speech-operated control under adverse noise conditions. By allowing a user 3 to interrupt the speech output of the speech communications system 1, the system can be forced to listen to the user 3. This is advantageous in case of situations as described in the following.

In order for the speech communications system 1 to be able to detect speech information coming from the user 3 while the speech communications system 1 provides a speech output to the user 3, it is necessary for the speech communications system 1 to pick up audio information with the microphone arrays 2 as described with reference to FIG. 1 and to eliminate the speech output provided by the speech communications system 1 from the total audio information that is picked up with the microphone arrays 2. In other words, the speech communications system 1 must be able to listen while it is talking. Under adverse conditions, the speech communications system 1 may not be able to sufficiently eliminate the speech output of the speech communications system 1 from the overall audio information picked up by the microphone arrays 2. This results in a "system-talk residual" which in more general terms is called a noise residual. This noise residual adversely affects the speech recognition capabilities of the speech communications system 1. For example, the noise residual reduces the speech recognition rate in case of a large vocabulary that the speech recognizer 4 has to be able to recognize.

I order to avoid a so-called noise residual caused by the speech output of the speech communication system 1 in states of the interaction that require a large vocabulary, the replies of the speech communications system 1 are preferably very short when requesting information from the driver or user 3 where the number of items that can be expected from him/her is large, for example when there are more than 10,000 possible items. This way it is very likely that the user 3 will talk after the short response or question of the speech communications system 1 is finished. Due to the fact that the question or response of the speech communications system 1 is so short, it is unlikely that the user 3 will be able to interrupt the speech output of the speech communications system 1.

In order to give the user 3 control over pausing the interaction when the user 3 has to focus on a driving maneuver or some other driving situation that requires attention, the user 3 can tell the speech communications system 1 to pause or sleep. When the user 3 addresses the speech communications system 1 again, the speech communications system 1 already has the information that has been entered prior to the interruption or time-out. The interaction can therefore be continued at the point where it was interrupted. If several interruptions or time-outs occur, the speech communications system 1 will ask the user 3 if he/she is finished with the particular task or would like to wait until later to complete the particular task. When a task is completed, the speech communications system will finish the interaction and wait until the user 3 calls it again.

Figure 2:
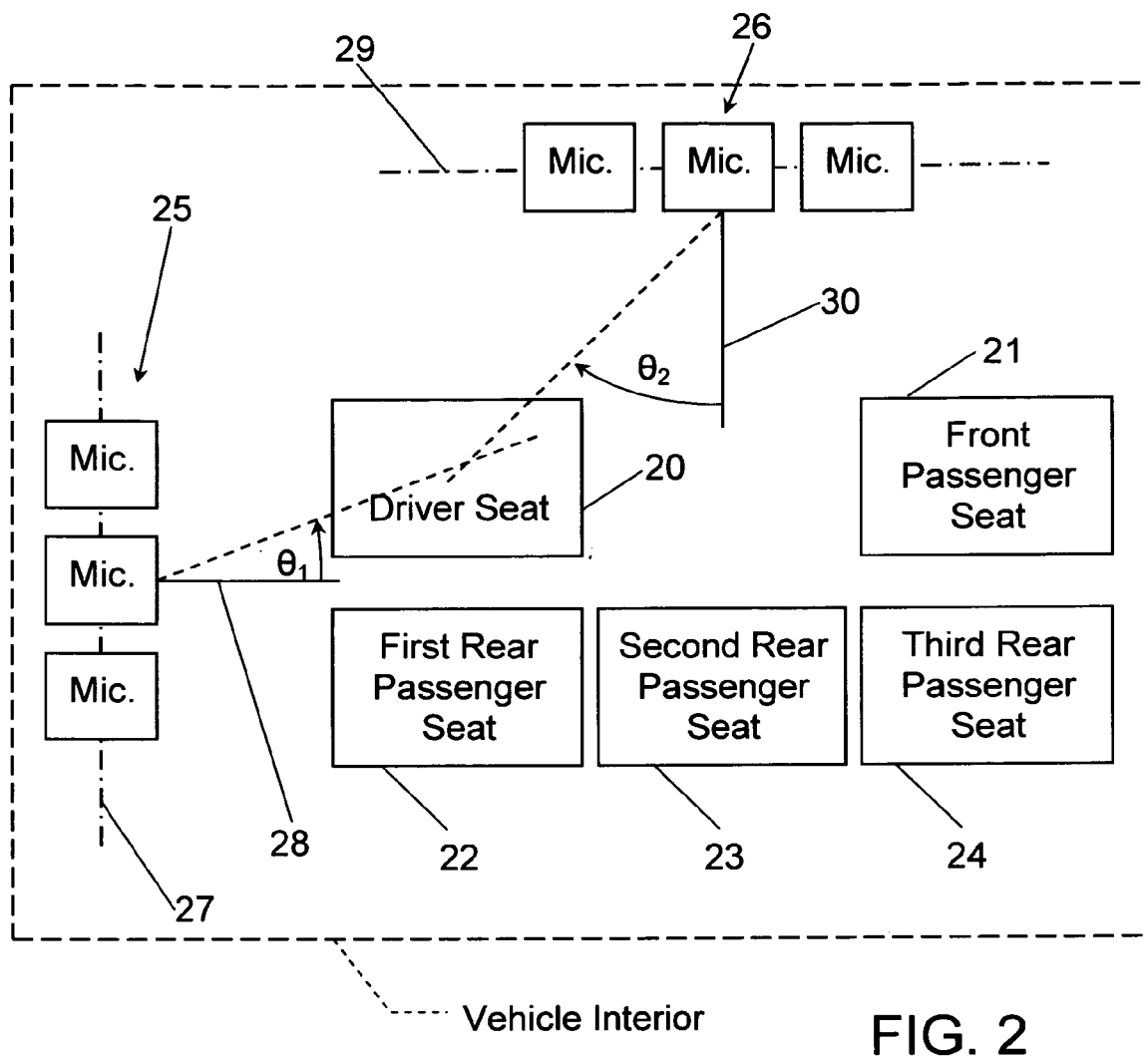
FIG. 2 is a schematic top view of a vehicle interior illustrating in an exemplary manner the position of vehicle seats and microphone arrays in accordance with the invention.

FIG. 2 is a schematic top view of a vehicle interior illustrating in an exemplary manner the position of vehicle seats 20, 21, 22, 23, 24 and microphone arrays 2 in accordance with the invention. FIG. 2 schematically shows a driver seat 20, a front passenger seat 21, and a first rear passenger seat 22, a second rear passenger seat 23, and a third rear passenger seat 24. FIG. 2 further shows the configuration of the microphone arrays 2 for sound localization. Microphone arrays 2 are able to detect the direction or angle θ from which a sound is coming from. With two microphone arrays 2 spatially located on different sides of the motor vehicle as shown in FIG. 2, two angles $\theta_1$ and $\theta_2$ are detected. These two angles $\theta_1$ and $\theta_2$ define the location that the sound is coming from.

Further, seat sensors 9 for detecting a seat occupancy are provided in order to increase the accuracy and reliability of the determination of the location of the sound source. The information from the seat sensors 9 is preferably used to reduce the number of possibilities as to where the sound might be coming from.

As shown in FIG. 2, a first microphone array 25 is located to the left of the seats and a second microphone array 26 is located in front of the seats. A microphone array includes at least two microphones positioned at a given distance from one another. Due to the spacing distances between the microphones the sound waves coming from a user 3 arrive at a respective different time at the microphones of a microphone array. The positions of the microphones of the first microphone array 25 define a first direction 27 and a first normal 28 with respect to the first direction 27. The first angle $\theta_1$ is the angle between the source of a sound and the first normal 28. Correspondingly, the positions of the microphones of the second microphone array 26 define a second direction 29 and a second normal 30 with respect to the second direction 29. The second angle $\theta_2$ is the angle between the source of the sound and the second normal 30.

The microphone arrays 2 which are provided in the passenger compartment of the motor vehicle determine the respective angles $\theta_1$ and $\theta_2$. As is illustrated in FIG. 2, the angles $\theta_1$ and $\theta_2$ define the position from which the sound is coming from. In the example shown in FIG. 2, the sound source is at the driver seat 20. The sound localizer 8 determines the source of the sound based on the angles $\theta_1$ and $\theta_2$. As described above, the sound localizer 8 preferably also uses the information provided by the seat sensors 9 when determining the position of the sound source. The sound localizer 8 is connected to the interaction manager 10 and provides the interaction manager 10 with information about the location of the sound source. In the example illustrated in FIG. 2, the interaction manager 10 determines that the driver is speaking based on the information received from the sound localizer 8.

Figure 3:
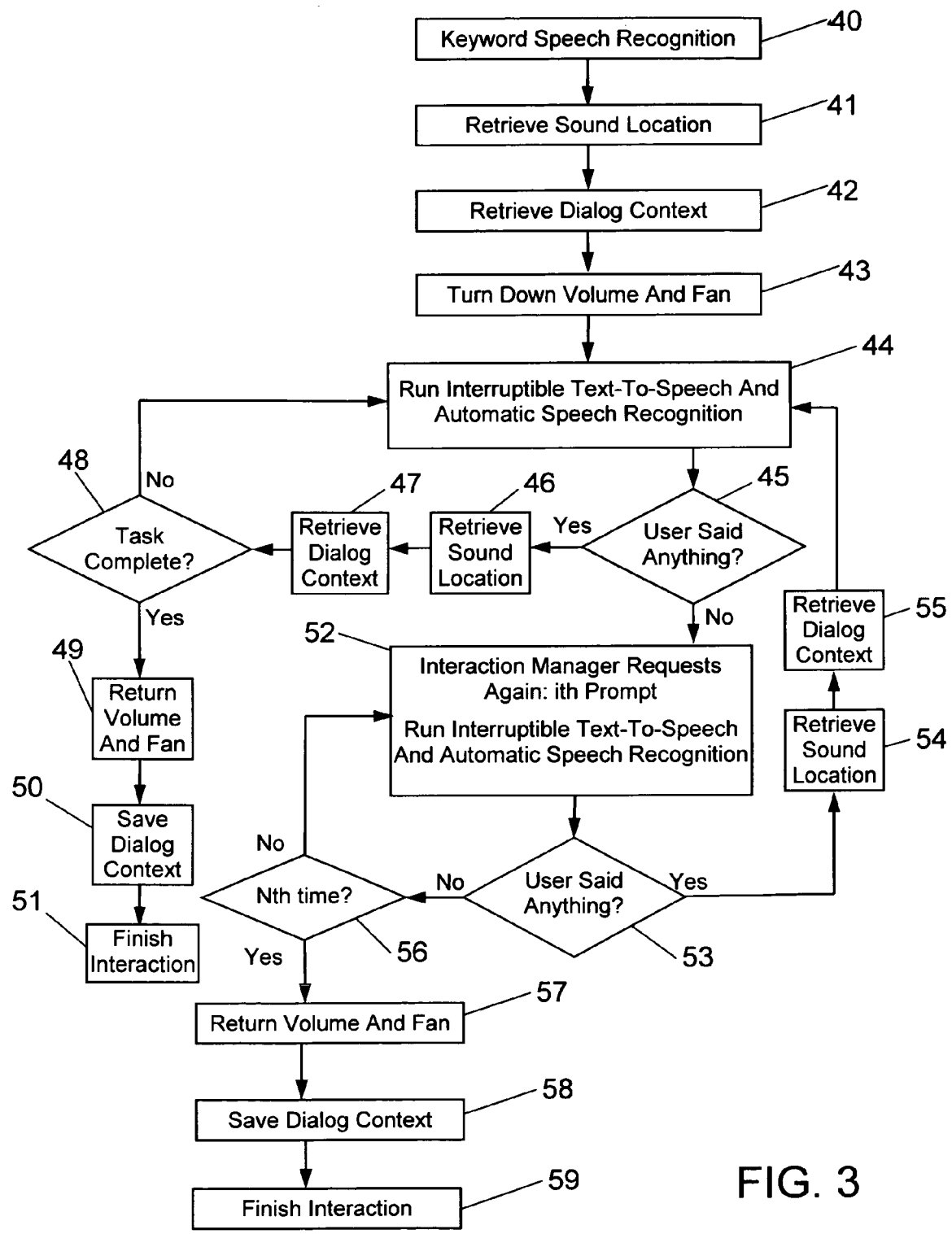
FIG. 3 is a flow chart illustrating steps in an exemplary method of operating a speech communications system for a vehicle in accordance with the invention.

FIG. 3 is a flow chart illustrating steps of an exemplary method for operating a speech communications system according to the invention. More specifically, FIG. 3 illustrates the steps for an interaction between the user 3 and the speech communications system 1 without using a push-to-talk button. In a keyword detection step 40, the speech recognizer 4 detects a keyword spoken by the user 3. The keyword is for example a name for the motor vehicle such as "AUDI" or "VOLKSWAGEN." Using such a keyword allows the user 3 to initiate an interaction with the speech communications system 1 without having to press a push-to-talk button. Initiating an interaction between the user 3 and the speech communications system 1 by addressing the motor vehicle by voice is similar to initiating a person-to-person interaction and is therefore more intuitive and more user-friendly than initiating an interaction by pressing a push-to-talk button.

Subsequent to the keyword detection step 40, i.e. after a keyword has been detected (e.g. "AUDI" or "VOLKSWAGEN"), the interaction manager 10 performs a sound location retrieval step 41 and retrieves information about the location of the source of the sound. The interaction manager 10 also performs a dialog context retrieval step 42 which provides the context or situation as it relates to the user's speech utterance. This allows an interpretation of the user's speech utterance in dependence of the context of the speech or situation when the speech utterance was made and, as a result, the interpretation of the user's speech utterance is improved.

In a noise control step 43, interaction manager 10 then instructs the motor vehicle to turn down the radio volume to a point where speech recognition errors are sufficiently small. In the noise control step 43, the interaction manager 10 also controls the fan speed and lowers the fan speed in order to reduce noise and as a result reduce speech recognition errors.

Further, an automatic speech recognition and text-to-speech operation 44 is performed. At this point, a normal speech recognition, i.e. a non-keyword speech recognition interaction starts. It is noted that this speech recognition interaction allows the user 3 to interrupt the text-to-speech operation.

In a decision step 45, it is determined whether there is a speech utterance by a user 3. If any user 3, which may be the driver, a front seat passenger, or a rear seat passenger, said anything, then a sound location retrieval step 46 as well as a dialog context retrieval step 47 is performed and information about the location of the user 3 and the dialog context are extracted.

In a further decision step 48, a decision is made as to whether the task has been completed or not. The task may for example be the process of entering a destination address by voice when the user 3 needs the help of a navigation system. If the task has not been completed, for example, if the destination address has not been entered yet, then the speech communications system 1 continues with the automatic speech recognition and text-to-speech operation 44. If the task has been completed, the speech communications system 1 performs a step 49 that restores the volume setting for the stereo system and the fan speed setting for the fan 7. Specifically, the radio volume and the fan speed are increased to their respective levels that were present prior to the noise control step 43. In further steps 50, 51, the speech communications system 1 saves the dialog context and finishes the interaction.

If, at the decision step 45, the speech communications system 1 determines that no user 3 said anything, then the interaction manager 10 performs a speech request operation 52. The interaction manager 10 will request the user 3 to say something for a maximum number of times using the text-to-speech and the speech recognition capabilities of the speech communications system 1. After each request, a decision 53 is made whether the user 3 provided a speech utterance in response to the request of the interaction manager 10.

If the user 3 responded to the request of the interaction manager 10, then the location of the source of the sound is retrieved in a sound location retrieval step 54 and the dialog context is retrieved in step 55. The interaction between the user 3 and the speech communications system 1 then continues with the speech recognition operation and text-to-speech operation 44. In other words, the sound information coming from the user 3 is converted to a set of words and the speech communications system 1 responds with a speech output or performs a function for the user 3.

If the decision steps 53 and 56 determine that the user 3 did not respond after a maximum number N of requests, N being an integer number, the interaction manager 10 announces to the user 3 that the interaction will be ended. The speech communications system 1 performs a step 58 in order to save the dialog context and returns to a keyword speech recognition mode. In a further step 57, the volume of the radio, which had been turned down to improve speech recognition, is turned up again to its previous setting. In addition, the fan 7 speed is returned to its prior speed setting. After finishing the interaction with step 59, the speech communications system 1 then operates to detect a keyword which is spoken by the user 3 if the user 3 wants to initiate another speech interaction.

The capabilities of the speech communications system 1 operating in accordance with the method shown in FIG. 3 are illustrated in an exemplary manner in the following dialog sequence between the driver of a motor vehicle and the speech communications system 1. The speech information provided by the driver and the system, i.e. the speech communications system 1, are provided in quotes. Comments that explain the driving situations and the operation of the speech communications system 1 are provided in parenthesis.

Driver: "AUDI" (The driver addresses the system while driving with the radio turned on).

System: "Yes?"

Driver: "Setup destination."

System: "Street name please" (The speech communications system determines that the sound comes from the driver and enables the destination setup operation).

Driver: "First street."

System: "Which city? Palo Alto, Mountain V . . . " (The speech communications system asks for a city and offers names of cities as possible answers; the driver then interrupts the text-to-speech operation by answering).

Driver: "Mountain View."

System: "Please say the street number."

Driver: (The driver does not reply because a driving situation such as making a turn, passing another car or braking in an emergency situation requires the driver's full attention and the driver has to focus on the task of driving rather than answering the question about the street number).

System: "I need the street number to set up your destination."

Driver: (The driver does not reply because the driver is still focusing on the driving situation that requires the driver's full attention).

System: "I will finish the interaction when you are ready. Say AUDI to continue." (The system saves the dialog context and stops asking for the street number).

Driver: "AUDI" (After a few minutes, the driver wants to resume the interaction with the system and addresses the system with the keyword AUDI).

System: "Yes, we were setting your destination; please tell me the street number" (The system retrieves the dialog context that has been saved and continues the interaction based on the dialog context).

Driver: "4810."

System: "Thanks, here are the directions . . . " (The system has the destination information and provides driving directions for the driver).

The above exemplary dialog sequence illustrates how the speech communications system 1 minimizes driver distraction by interrupting a dialog in order to allow the driver to concentrate on a driving situation. The speech communications system 1 improves user friendliness by continuing an interrupted dialog at the point where the dialog was interrupted. Continuing an interrupted dialog makes the speech input more efficient because information need not be input repeatedly. The above dialog sequence also illustrates that the interaction is intuitive because it proceeds in a manner that is similar to a conversation between two people who have a conversation, interrupt the conversation, and later pick up the conversation at the point where they broke off the conversation.

What is claimed is:

1. In combination with a vehicle having a vehicle interior, a speech communications system comprising:
    a microphone system provided in the vehicle interior, said microphone system being configured to detect audio information;
    a speech recognizer operatively connected to said microphone system;
    an interaction manager operatively connected to said speech recognizer, said interaction manager providing grammar information to said speech recognizer, said speech recognizer being configured to provide speech recognition results to said interaction manager;
    an acoustic echo canceller operatively connected to said speech recognizer, said acoustic echo canceller being configured to at least partially eliminate portions of the audio information detected by said microphone system;
    a sound localizer operatively connected to said microphone system and to said interaction manager, said sound localizer being configured to determine a positional sound source location in the vehicle interior;
    said microphone system including a first microphone array and a second microphone array, each of said microphone arrays including at least two microphones that do not operate as loudspeakers and that are not configured to be switched to an audio playback state;
    said at least two microphones of said first microphone array have respective positions which define a direction and a normal with respect to the direction such that the normal and the direction intersect at a center of said first microphone array, said at least two microphones of said second microphone array have respective positions which define a direction and a normal with respect to the direction such that the normal and the direction intersect at a center of said second microphone array;
    said center of said first microphone array and said center of said second microphone array being spaced from one another by a given spacing distance wherein said first microphone array is disposed on a first side of the vehicle interior and said second microphone array is disposed on a second side of the vehicle interior;
    said sound localizer determining a first sound source angle as a function of audio information provided by said first microphone array and said sound localizer determining a second sound source angle as a function of audio information provided by said second microphone array;
    said sound localizer determining a positional sound source location in dependence on the first sound source angle and the second sound source angle;
    said speech recognizer being configured to recognize a spoken keyword; and
    said interaction manager being configured to retrieve a stored dialog context and to start a speech interaction triggered by the spoken keyword;
    a text-to-speech unit operatively connected to said interaction manager; and
    said interaction manager being configured to selectively prompt said text-to-speech unit to provide a speech output and to interrupt a speech output.

2. The speech communications system according to claim 1, wherein said interaction manager selectively enables and disables a user-controllable function in dependence on the positional sound source location.

3. The speech communications system according to claim 1, including:
    a seat sensor connected to said sound localizer, said seat sensor providing seat occupancy information to said sound localizer; and
    said sound localizer determining a positional sound source location in dependence on the first sound source angle, the second sound source angle and the seat occupancy information.

4. The speech communications system according to claim 1,
    wherein said acoustic echo canceller is configured to at least partially eliminate the speech output provided by said text-to-speech unit from the audio information detected by said microphone system.

5. The speech communications system according to claim 1, including:
- a vehicle stereo system operatively connected to said interaction manager, said interaction manager being configured to control a volume setting for said vehicle stereo system; and
- said acoustic echo canceller being configured to at least partially eliminate sound produced by said vehicle stereo system from the audio information detected by said microphone system.

6. The speech communications system according to claim 1, wherein:
- the vehicle has a ventilation fan operatively connected to said interaction manager; and
- said interaction manager controls a fan speed setting for said ventilation fan.

7. A method of operating a speech communications system in a vehicle, the method which comprises:
- detecting audio information with a microphone system provided in a vehicle interior, the microphone system including a first microphone array and a second microphone array, each of the microphone arrays including at least two microphones that do not operate as loudspeakers and that are not configured to be switched to an audio playback state, the at least two microphones of the first microphone array being disposed at respective positions which define a direction and a normal with respect to the direction such that the normal and the direction intersect at a center of the first microphone array, the at least two microphones of the second microphone array being disposed at respective positions which define a direction and a normal with respect to the direction such that the normal and the direction intersect at a center of the second microphone array, the center of the first microphone array and the center of the second microphone array being spaced from one another by a given spacing distance wherein the first microphone array is disposed on a first side of the vehicle interior and the second microphone array is disposed on a second side of the vehicle interior;
- running an interruptible text-to-speech operation based on a dialog context in order to provide a speech output;
- running a speech recognition operation for providing a speech recognition result;
- requesting voice information for a maximum number of times if insufficient voice information or no voice information is provided in response to the speech output provided by the interruptible text-to-speech operation;
- saving a dialog context of an unfinished speech interaction;
- determining a first sound source angle as a function of audio information provided by the first microphone array of the microphone system;
- determining a second sound source angle as a function of audio information provided by the second microphone array of the microphone system; and
- determining a positional sound source location based on the first sound source angle and the second sound source angle.

8. The method according to claim 7, which comprises:
- recognizing a keyword with the speech recognition operation; and
- retrieving the dialog context which has been saved for the unfinished speech interaction.

9. The method according to claim 7, which comprises at least partially eliminating the speech output provided by the text-to-speech operation from the audio information detected with the microphone system by performing an echo cancellation operation.

10. The method according to claim 7, which comprises at least partially eliminating sound generated by a vehicle stereo system from the audio information detected with the microphone system by performing an echo cancellation operation.

11. The method according to claim 7, which comprises controlling a fan speed of a ventilation fan in order to improve the speech recognition result provided by the speech recognition operation.

12. The method according to claim 7, which comprises controlling a volume setting of a vehicle stereo system in order to improve the speech recognition result provided by the speech recognition operation.

13. The method according to claim 7, which comprises:
- detecting a seat occupancy by using a seat sensor; and
- determining a positional sound source location in dependence on the first sound source angle, the second sound source angle, and seat occupancy information.

14. The method according to claim 7, which comprises:
- determining a positional sound source location in the vehicle interior; and
- selectively enabling and disabling a user-controllable function in dependence on the positional sound source location.

* * * * *